United States Patent [19]
Li et al.

[11] Patent Number: 5,714,547
[45] Date of Patent: Feb. 3, 1998

[54] POLYMER BLEND COMPOSITION FOR FORMING TRANSPARENT POLYETHYLENE FILM

[75] Inventors: Raphael Li, Parsippany; Peter Chen, Livingston, both of N.J.; Andy Yang, Victoria, Tex.; Rajender Singh; Ching-Shu H. Lin, both of Port Lavaca, Tex.

[73] Assignee: Inteplast Corporation, Livingston, N.J.

[21] Appl. No.: 511,696

[22] Filed: Aug. 4, 1995

[51] Int. Cl.⁶ .................................................. C08L 23/00
[52] U.S. Cl. ............................................................ 525/240
[58] Field of Search ........................................ 525/240

[56] References Cited

U.S. PATENT DOCUMENTS

| | | | |
|---|---|---|---|
| 3,176,051 | 3/1965 | Gregorian et al. | 260/878 |
| 3,367,926 | 2/1968 | Voeks | 260/935 |
| 3,998,914 | 12/1976 | Lillis et al. | 260/897 A |
| 4,770,912 | 9/1988 | Furrer et al. | 428/35 |
| 4,808,650 | 2/1989 | Titus et al. | 524/106 |
| 4,845,137 | 7/1989 | Williams et al. | 524/106 |
| 5,272,236 | 12/1993 | Lai et al. | 526/348.5 |

*Primary Examiner*—Edward J. Cain
*Attorney, Agent, or Firm*—Kenneth P. Glynn

[57] ABSTRACT

The present invention relates to a blown film forming composition which improves the clarity, haze and gloss while improving or maintaining the mechanical properties of the high density polyethylene film. The film forming composition includes about 50 to about 99% by weight of an ethylene polymer of density in the range of about 0.940 g/cm³ to about 0.970 g/cm³ and a melt index of no more than 1.0 g/10 min. measured at 190° C. and 5 Kg load and about 50 to about 1% by weight of an additive consisting of (a) about 10 to 100% of a plastomer-type ethylene polymer of density in the range of about 0.900 to about 0.920 g/cm³ and of melt index from about 0.1 to about 10 g per 10 minutes, and (b) about 90 to 0% of a copolymer of ethylene and vinyl acetate of density from about 0.910 to about 0.940 g/cm³ and of melt index ranging between about 0.1 and about 10 g/10 min.

20 Claims, No Drawings

POLYMER BLEND COMPOSITION FOR FORMING TRANSPARENT POLYETHYLENE FILM

BACKGROUND OF THE INVENTION

1. Field of the Invention

The present invention relates to a high density polyethylene composition useful for producing film products of improved clarity and high gloss while improving or maintaining mechanical and physical characteristics of high density polyethylene films.

2. Information Disclosure Statement

Ethylene polymer having a density above 0.940 g/cm$^3$ is defined by ASTM D-1248 as high density polyethylene (hereinafter referred to as HDPE). The films of HDPE have such properties as low-temperature brittleness, high tensile strength, high stiffness, low permeability to gases and vapors and high dart impact. These properties are very desirable for film products. Additionally, the HDPE can be downgauged by inflation process to very thin film (<10 μm) which is economically a very feasible feature. However, the high haze and low gloss of the HDPE film has limited its application.

To make an HDPE transparent, it is known to uniaxially draw a semitransparent HDPE film to a ratio of 5 to 10 and press it between rolls. The film obtained by this method does have a good transparency, but features a remarkable orientation in the drawing or rolling direction, and thus there is remarkable directionality in the aspect of film strength, resulting in a tendency to easy tearing, the obtaining of an insufficient strength, an uneven heat contraction, warping in the film, heat sealing inability, and other defects.

To obtain a film of balanced orientation in both longitudinal and lateral directions through the use of high molecular weight HDPE, the general practice has been to use air-cooled inflation. With this method, it has been possible to obtain a film with superior strength through balancing the molecular orientation with the blow up ratio, the take up speed and the frost line height, but since air is used for cooling, only translucent or semitransparent films have been obtainable.

In order to obtain HDPE films of better optical properties, additives are added to the HDPE resin to improve the optical properties of the HDPE films. U.S. Pat. No. 3,176,051 discloses an HDPE blend composition and a process to mix the blend composition to improve the optical clarity of the HDPE. The high density polyethylene which had a density of 0.940–0.970 g/cm$^3$ and a melt index (hereinafter referred to as MI) in the range of 0.5 to 10 g/10 min. was blended with 0.1 to 10% by weight of an additive consisting of polyethylene having a reduced viscosity in the range of 2.9 to 10 and an ethylene-butene-1 copolymer having a reduced viscosity in the range of 4.0 to 10. However, the ethylene homopolymer and ethylene-butene-1 copolymer which were blended with the HDPE had very high molecular weights so that melt index measurements above 0.0 g/10 min. were not available. (All melt indices herein are based on measurements at 190° C. and 2.16 Kg load, for the high density polyethylene, and at 190° and 2.16 Kg load for all other polymers and components, throughout this application and claims, unless otherwise indicated.)

U.S. Pat. Nos. 4,845,137, 4,808,650 and 3,367,926 disclose using nucleating agent to improve the clarity of polyolefins which include HDPE. The nucleating agents promote crystallization at many sites which as a result produce spherulites of small size. Since the smaller spherulites do not refract light, transparency of the parent polymer is obtained. The nucleating agent is especially advantageous in those polyolefins, such as polypropylene, which on rapid cooling from a melted condition, normally exhibit pronounced tendency to supercool in non-crystalline state until the temperature is substantially below their crystalline melting points and which, on slow cooling from a melted condition, tend to form large spherulites. However, the effect of nucleating agent is insignificant in polyethylene since polyethylene freezes much more quickly than polypropylene.

U.S. Pat. No. 3,998,914 discloses an HDPE film of high clarity by using a blend of 70 to 95% of HDPE which had a density in the range of 0.950–0.965 g/cm$^3$ and an MI lower than 10 g/10 min. and 5 to 30% of ethylene homopolymer which had an MI in the range from about 0.1 g/10 min to about 10 g/10 min. and a density in the range of 0.910–0.945 g/cm$^3$ (hereinafter referred to as LDPE) or an ethylene-butene-1 copolymer containing a minor amount of butene-1 which had an MI in the range of about 0.1 g/10 min to about 10 g/10 min and a density in the range of about 0.910–0.945 g/cm$^3$. However, the HDPE used in this film must have narrow molecular weight distribution with stress exponent less than 1.4, which makes the HDPE resin difficult to process. In addition, blending LDPE with HDPE reduces the dart impact strength of the HDPE film. Blending LDPE with HDPE also affects the downgauged capability of the HDPE film.

Ethylene copolymers having a density of 0.88 to 0.945 g/cm$^3$ were also blended with HDPE in the prior art (U.S. Pat. Nos. 3,998,914 and 4,954,391) to improve the optical properties of the HDPE. The ethylene copolymers which can be included include hydrocarbon copolymer of a major mole percent (greater than or equal to 80%) of ethylene and a minor mole percent (less than or equal to 20%) of one or more $C_3$ to $C_8$ alpha olefins. The $C_3$ to $C_8$ alpha olefins are propylene, butene-1, pentene-1, 4 methyl-pentene-1, hexene-1 and octene-1. Ethylene copolymer of density in the range from 0.88 to 0.910 g/cm$^3$ is typically categorized as very low density polyethylene (hereinafter referred to as VLDPE) while linear low density polyethylene (hereinafter referred to as LLDPE) is categorized between 0.910 and 0.945 g/cm$^3$. The films of blend of HDPE and LLDPE generally have better mechanical properties than those of blend of HDPE and LDPE. However, the optical properties of HDPE/LLDPE blown films are inferior to blown film of HDPE/LDPE blend since LLDPE has a linear structure which makes itself hazy. Films of 100% VLDPE have better optical properties than those of LLDPE. It is, therefore, believed that blending VLDPE with HDPE can greatly improve the optical properties of HDPE film. However, the miscibility of ethylene copolymer with HDPE decreases with decreasing density of ethylene copolymer. As a result, the optical properties of the HDPE film is not greatly improved by blending HDPE with VLDPE. The film of immiscible blend of ethylene copolymer and HDPE also has inferior physical properties.

U.S. Pat. No. 4,770,912 disclosed a resin composition which comprised (a) 30 to 70% by weight of an HDPE having a density above 0.95 g/cm$^3$ and an MI of from 0.05 to 0.8 g/10 min., (b) 20 to 40 weight percent of an LLDPE having a density of 0.91 to 0.93 g/cm$^3$ and an MI of less than 2.0 and (c) 10 to 30 weight percent of a VLDPE having a density less than 0.91 g/cm$^3$ and a melt index of 0.8 to 1.1. Films of the above resin composition are soft and of relative high strength and are suitable for bag application. However, the resin composition does not improve optical properties of the film.

To overcome the foresaid shortcomings of the above prior art and to improve the optical properties of the HDPE blown film while maintaining or improving the mechanical properties of the film, an HDPE film forming composition is disclosed in this invention which is neither taught nor rendered obvious by the above cited prior art.

SUMMARY OF THE INVENTION

The present invention provides an HDPE film forming composition comprising about 50 to about 99% by weight of an HDPE having a density in the range of about 0.940–0.970 g/cm$^3$ and a melt index less than 1.0 g/10 min., i.e. in ranges between about 0.1 and about 1.0 g/10 min., measured at 190° C. and a load of 5 Kg weight, and about 50 to about 1% by weight of an additive of a plastomer-type ethylene polymer (PEP) which incorporates long chain branching into a linear, short-chain branched polymer molecular structure by single-site catalysts and a copolymer of ethylene and vinyl acetate (EVA). The polymeric blend of PEP and EVA contains at least about 10% of PEP and about 0–90% of EVA. The PEP contains about 1 to about 20% of octene as commoner and has a density which ranges from 0.900 to 0.920 g/cm$^3$, a melt index from 0.1 to 10 g/10 min. and a molecular weight distribution of less than 3. The copolymer of ethylene and vinyl acetate has a density in the range of 0.910–0.940 g/cm$^3$, a melt index of 0.1–10.0 g/10 min and vinyl acetate content ranging between about 1 and about 20%. The HDPE composition reduces the haze while improving or maintaining the elongation, dart impact, tensile and tear strength of the HDPE blown film. In addition, the HDPE composition improves the processability of the HDPE in the extrusion process. Other additives such as antistatic agents, antiblocking agent, colorants and other known additives may be included in the composition without departing from the scope of this invention.

DETAILED DESCRIPTION OF THE PRESENT INVENTION

The HDPE film forming composition of the present invention comprises an HDPE and a blend of a plastomer-type ethylene polymer (hereinafter referred to as PEP) which incorporates long chain branching into a linear, short-chain branched polymer molecular structure and a copolymer of ethylene and a vinyl acetate (hereinafter referred to as EVA). The PEP is made by single-site catalyst by which the commoner can be inserted with great precision. Conventional catalysts contain several sites, each spawning variable molecular weights and molecular weight distributions—this diffuses properties. In single-site catalyst, identical sites generate highly uniform molecules. By single-site catalyst, the commoner can be inserted more easily and with greater precision, which makes the PEP different from LLDPE, LDPE, VLDPE and other ethylene copolymers.

The PEP is better than LLDPE and VLDPE but inferior to LDPE in improving the optical properties of the HDPE film when being mixed with HDPE. The PEP, however, improves and maintains the mechanical properties of the HDPE film. EVA which has properties very close to LDPE, when being blended with HDPE, can significantly reduce the haze but affects the dart impact and tear strength of the HDPE film. It is quite surprising to discover that EVA when being added to HDPE improves the optical properties but deteriorates the mechanical properties of the HDPE film; that PEP when being blended with the HDPE resin improves and maintains the mechanical properties but has limited effect on the optical properties of the HDPE film; yet together EVA and PEP, when used as stated herein, actually improve the optical properties of the HDPE film to the level of films of HDPE/EVA blend while improving or maintaining the dart impact, tensile and tear strength of the HDPE film.

The object of this invention is to provide an HDPE composition for manufacturing HDPE film of high clarity and transparency. Besides optical properties improvement, the HDPE composition improves or maintains the elongation, dart impact, tensile and tear strength of the HDPE film. An additional object of this invention is to use the HDPE composition to improve the processability of the HDPE blown film process. Another object of this invention is to downgauge HDPE film of high clarity.

The present invention relates to an HDPE blown film forming composition which when extruded, forms a film having good optical properties while improving or maintaining the elongation, dart impact, tensile and tear strength of the HDPE film. In addition, the HDPE film forming composition can be downgauged to a thickness below 10 μm by inflation process. The film forming composition comprises an HDPE and a blend of a plastomer-type ethylene polymer and a copolymer of ethylene and vinyl acetate.

Polymers

The high density polyethylene which can be included in the present invention has a density of about 0.940 to about 0.970 g/cm$^3$, preferably within the range from about 0.940 to about 0.950 and a molecular weight having a melt index measured at 190° C. and 5 Kg load of about 0.1 to about 1.0 g/10 min., preferably to be between 0.1 and 0.5 g/10 min. The HDPE is a bimodal polymer which has a broad molecular weight distribution. The molecular weight distribution of the HDPE ranges from 10 to 35, preferably of the range between 15 and 30. The proportion of the HDPE in the whole resin composition is from about 50 to about 99% by weight of the total resin and preferably is between about 65 and about 95%.

The other component which comprises about 50 to about 1% by weight of the total resin, preferably about 35 to about 5%, is a blend of a plastomer-type ethylene polymer and a copolymer of ethylene and vinyl acetate. The blend of PEP with EVA comprises from about 10 to 100% of PEP, preferably from about 50 to about 100% of PEP.

The preferred plastomer-type ethylene polymer for use in the present invention includes those which may be produced in accordance with the procedures set forth in U.S. Pat. No. 5,272,236 issued in December, 1993 and U.S. Pat. No. 5,278,272 issued in January, 1994, both patents being incorporated herein by reference. The PEP is made by single-site catalyst. By single-site catalyst, the commoner can be inserted more easily and with greater precision, which makes the PEP different from LLDPE, LDPE, VLDPE and other ethylene copolymers. Although the prior art teaches methods of improving charity and gloss of HDPE film by blending with various resins or additives, there is no disclosure of the use of PEP.

The PEP has a density ranging from about 0.900 to about 0.920 g/cm$^3$, preferably from about 0.900 to about 0.910 g/cm$^3$, a molecular weight sufficient to have a melt index measured at 190° C. and 2.16 Kg load of not more than about 10 g/10 min., preferably not more than about 5 g/10 min. and a molecular weight distribution less than 3.0.

The preferred copolymer of vinyl acetate and ethylene has a vinyl acetate content ranging from about 1 to about 20% and in a preferred embodiment, ranging from about 1 to about 10%. The copolymer has a density ranging from 0.910 to 0.940 g/cm³ and a melt index ranging between about 0.1 and about 10 g/10 min. The preferred copolymer of vinyl acetate and ethylene has a density from 0.920 to 0.935 g/cm³ and has a melt index of from about 0.1 to about 2.0 g/10 min.

The polymers can be used in the form of powders, pellets, granules, or any other form that can be fed to an extruder.

Blending Polymers

The plastomer-type ethylene polymer and EVA are mixed with HDPE using hot process. The PEP and EVA can be added to the HDPE polymer as individual components or admixtures and mixed by any suitable mixing means.

The PEP and EVA can be uniformly blended in the high density polyethylene extrusion composition. The blending can be effected by various dispersion techniques commonly employed by those skilled in the art. The PEP and EVA can be compounded directly into the HDPE polymer using conventional hot processing equipment such as a Banbury mixer, a twin screw mixing extruder or a single screw mixing extruder. The extruder has pelletization equipment on the head of the extruder which pelletizes the extruded strings. The pellets formed from this compounding process have the specified HDPE film forming composition and are ready for the blown-film extrusion.

Extruding Films

The films produced by the composition of the present invention can be extruded by tubular blown film extrusion. In the process, a molten polymer with the composition of the present invention is extruded through an annular die having a die gap of greater than about 1.0 mm to less than about 2.0 mm, preferably greater than 1.0 mm and less than 1.5 mm. The polymer blend is extruded at a temperature of about 350° to about 450° F., preferably in the range between 380° and 435° F. and is extruded in an upward vertical direction in the form of a tube although it can be extruded downward or even sideways. After extrusion of the molten polymer through the annular die, the tubular film is expanded to the desired extent and cooled. The tubular film is cooled by forced chilling air blow at the outer surface of the film. It is preferred but not required to have forced chilling air circulating inside the tube by an internal bubble cooling system which has a long stack to direct the chilling air to the middle section of the column in order to further enhance the quenching speed of the blown film. Faster quenching speed can further improve the optical properties of the blown film. The chilling air is controlled at a temperature of about 32° F. to about 65° F., preferably at a temperature less than 40° F. and greater than 32° F. The tubular film is then flattened by passing the film through a collapsing frame and a set of nip rolls. These nip rolls are driven, thereby providing means for withdrawing the tubular film away from the annular die.

A positive pressure of air is maintained inside the tubular bubble. As is known in the operation of conventional film processes, the pressure of the gas is controlled to give the desired degree of expansion of the tubular film. The degree of expansion, as measured by the ratio of the fully expanded tube circumference to the die annulus, is in the range of about 2/1 to about 6/1.

As the melt of the HDPE composition exits the annular die, the extrudate cools and its temperature falls below its melting point and it solidifies. The optical properties of the extrudate change as crystallization occurs and a frost line is formed. The position of this frost line above the annular die is a measure of the cooling rate of the HDPE film. This cooling rate, as discussed previously, has a very marked effect on the optical properties of the HDPE film produced herein. Crystallization effects dominate the optical properties of the ethylene polymer film described herein. Blown film process parameters have a very pronounced effect on the optical properties of these films.

Properties of Ethylene Polymers and Films

The present invention provides a formulation and a process to produce high density polyethylene film having thickness of less than 10 μm which significantly improves the haze of the HDPE film from above 60% to lower than 35% and the gloss from below 10% to above 20% without internal bubble cooling system while maintaining the mechanical properties of the HDPE film. In the case when the internal bubble cooling system is used, the haze and gloss of the film can be further improved to lower than 25% and higher than 25%, respectively.

The properties of the ethylene polymers and film produced therefrom were determined by the following methods:

Density: ASTM D-1505—Plaque is conditioned for one hour at 100° C. to approach equilibrium crystallinity, reported as g/cm³.

Melt index: ASTM-1238—At 2.16 Kg and 5 Kg loads, measured at 190° C., reported as grams per 10 minutes.

Molecular Weight Distribution Mw/Mn: Gel Permeation Chromatography.

Haze: ASTM D-1003—Percentage of transmitted light scattered more than 2.5 degrees from the normal incident beam. Reported as percent haze.

Tensile Strength and Elongation Percentage: ASTM 882—Film strips 1"×5" are clamped at a 2" gauge length and deformed at a jaw separation rate of 20 inch/min. Tensile strength is the engineering stress developed at break. Elongation percentage is the ratio of the extension at the moment of rupture of specimen to the initial gage length of specimen.

45° Specular Gloss: ASTM D-2475—Gloss measurement are measured using a Gardner glossmeter. 45° specular gloss is the relative luminous fraction reflectance of a film specimen where the incident beam is 45% off the normal and, the receptor is at the mirror reflection of the axis of the incident beam.

Dart Impact: ASTM D-1709—The dart weight at which 50% of the specimens which contains four plies of films would fail in the test. Reported as dart weight.

Elmendorf Tear Strength: ASTM D-1922—The force required to propagate tearing across a film. Reported as the force in grams.

EXAMPLES

The present invention will now be explained by the following Examples. The following examples are illustrative of the present invention and are not included as a limitation of the scope thereof.

To ascertain the superior properties of the composition, films were manufactured from polymers or blends of polymers listed in Table 1. The films were produced using a film inflation process. The properties of the films obtained were measured by ASTM methods discussed in the previous section.

EXAMPLE 1

Preparation of Polymeric Mixtures

Resin pellets of HDPE, plastomer-type ethylene polymer, copolymer of ethylene and vinyl acetate, low density polyethylene, very low density polyethylene and linear low density polyethylene of desired proportions were dry blended first. The mixture were then discharged to a Werner & Pfleiderer twin screw extruder, extruded at a melt temperature of approximately 195° C., pelletized and dried. The pellets were further dried at a temperature of 110° C. for 15 minutes.

EXAMPLE 2

In the Example, 100% HDPE was extruded through an annular die having a die gap of 1.0 mm and is extruded in an upward vertical direction in the form of a tube. The extruded temperatures were between 400° and 420° F. The blown film was cooled by forced chilling air from the air ring located at the bottom of the tube. No internal bubble cooling system was used. The blow up ratio was between 2.75 and 3.50. The optical and mechanical properties of the film are shown in Table 2.

EXAMPLES 3 TO 9

In the Examples, 80% by weight of HDPE was mixed with 20% of additives of various resins. Films of the resultant mixtures were manufactured by an inflation process as shown in Example 2. The tested results of the films are tabulated in Table 2.

It is shown in Table 2 that films made of the mixture of HDPE with LDPE or EVA (Examples 2 and 3) reduces the haze of the HDPE blown film from above 60% to about 22%, however, the dart impact strength drops below 30 g and the tear strength in the machine direction deteriorates. It is also shown in Table 2 that adding LLDPEs and VLDPE (Examples 6–8) into HDPE improves the tear and dart impact strength of the HDPE film, however, the haze of the films is above 45%. Adding 20% of PEP (Example 4) improves the haze of the HDPE film to about 30% and improves the tear and dart impact strength of the HDPE film. The haze of the HDPE film was further improved to 23% while improving or maintaining the mechanical properties of the HDPE film by adding 12% of PEP and 8% of EVA as shown in Example 9 of Table 2.

TABLE 1

| List of Polymers in the Examples | | |
|---|---|---|
| Polymer | Density (g/cm3) | Melt Index (g/10 min) |
| HDPE | 0.945 | 0.2* |
| PEP | 0.908 | 1.0 |
| EVA | 0.925 | 1.3 |
| LDPE | 0.924 | 0.8 |
| LLDPE-1 | 0.919 | 1.0 |
| VLDPE | 0.905 | 0.8 |
| LLDPE-2 | 0.912 | 1.0 |

*The flow rate is measured at 5 Kg load for HDPE and at 2.16 Kg load for all other polymers listed in this Table 1.

TABLE 2

Optical and Mechanical Properties of Films by Inflation Process

| Example | Base Polymer | Gauge (μm) | Haze (%) | Dart Impact Strength (g) | Tear Strength (g/mil) | | Gloss (%) | | Ultimate Strength (psi) | | Ultimate Strain (%) | |
|---|---|---|---|---|---|---|---|---|---|---|---|---|
| | | | | | MD | TD | MD | TD | MD | TD | MD | TD |
| 2 | 100% HDPE | 9.9 | 61 | 54 | 9.7 | 1120 | 8.4 | 8.9 | 6250 | 3370 | 230 | 670 |
| 3 | 80% HDPE + 20% EVA | 10.7 | 21 | <30 | 7.2 | 1340 | 32 | 28 | 8400 | 2290 | 190 | 660 |
| 4 | 60% HDPE + 20% LDPE | 7.9 | 22 | <30 | 7.9 | 590 | 30 | 30 | 7250 | 2380 | 210 | 630 |
| 5 | 80% HDPE + 20% PEP | 9.2 | 31 | 55 | 16.6 | 1250 | 29 | 25 | 7530 | 2780 | 250 | 600 |
| 6 | 80% HDPE + 20% LLDPE-1 | 9.2 | 48 | 56 | 11 | 990 | 11 | 11 | 6140 | 2450 | 270 | 740 |
| 7 | 80% HDPE + 20% VLDPE | 9.1 | 47 | 123 | 22 | 1390 | 11 | 11 | 6750 | 3550 | 290 | 750 |
| 8 | 80% HDPE + 20% LLDPE-2 | 9.6 | 49 | 74 | 12.3 | 1530 | 12 | 12 | 6970 | 2310 | 250 | 500 |
| 9 | 80% HDPE + 12% PEP + 8% EVA | 8.3 | 23 | 53 | 13 | 1540 | 25 | 24 | 6990 | 3110 | 220 | 770 |

Obviously, numerous modifications and variations of the present invention are possible in light of the above teachings. It is therefore understood that within the scope of the appended claims, the invention may be practiced otherwise than as specifically described herein.

What is claimed is:

1. A high density polyethylene blown film forming composition for improving optical properties while improving or maintaining dart impact, ultimate tensile and tear strength of high density polyethylene film, which comprises:

a) a high density polyethylene of density in the range of about 0.940 to about 0.970 g/cm$^3$, of melt index less than 1.0 g/10 min. measured at 190° C. and 5 Kg load, and of molecular weight distribution ranging from about 10 to about 35; and, b) about 1 to about 50% by weight, of an additive consisting of (i) about 10 to 100% of a plastomer-ethylene of density in the range of about 0.900 to about 0.920 g/cm$^3$, of melt index from about 0.1 to about 10 g/10 min. measured at 190° C. and 2.16 Kg load and of molecular weight distribution less than about 3, and (ii) about 90 to 0% of copolymer of ethylene and vinyl acetate density in the range of about 0.910 to about 0.940 g/cm³, of melt index from about 0.1 to about 10 g/10 min.

2. The composition of claim 1 wherein said ethylene plastomer being an ethylene copolymer containing about 1 to about 20% octene as commoner.

3. The composition of claim 1 wherein said copolymer of ethylene and vinyl acetate has a vinyl acetate content ranging from about 1 to about 20%.

4. The composition of claim 2 wherein said copolymer of ethylene and vinyl acetate has a vinyl acetate content ranging from about 1 to about 20%.

5. The composition of claim 1 wherein said high density polyethylene has a density in the range of about 0.940 to about 0.950 g/cm³.

6. The composition of claim 2 wherein said high density polyethylene has a density in the range of about 0.940 to about 0.950 g/cm³.

7. The composition of claim 3 wherein said high density polyethylene has a density in the range of about 0.940 to about 0.950 g/cm³.

8. The composition of claim 1 wherein said melt index of said high density polyethylene is between about 0.1 and about 0.5 g/cm³.

9. The composition of claim 1 wherein said melt index of said ethylene plastomer is between about 0.1 to about 5 g/10 min.

10. The composition of claim 1 wherein said copolymer of ethylene and vinyl acetate has a vinyl acetate content ranging from about 1 to about 10%.

11. A high density polyethylene film of thickness less than 10 μm, of haze less than 35% and of tear strength in machine direction greater than 10 g/mil, said high density polyethylene film being manufactured from a composition of polymers comprising:

a) a high density polyethylene of density in the range of about 0.940 to about 0.970 g/cm³, of a melt index less than 1.0 g/10 min. measured at 190° C. and 5 Kg load, and of molecular weight distribution ranging from about 10 to about 35; and, b) about 1 to about 50% by weight, of an additive consisting of (i) about 10 to 100% of a ethylene plastomer of density in the range of about 0.900 to about 0.920 g/cm³, of melt index from about 0.1 to about 10 g/10 min. measured at 190° C. and 2.16 Kg load and of molecular weight distribution less than about 3, and (ii) about 90 to 0% of copolymer of ethylene and vinyl acetate of density in the range of about 0.910 to about 0.940 g/cm³, of melt index from about 0.1 to about 10 g/10 min.

12. The film of claim 11 wherein said ethylene plastomer being an ethylene copolymer containing about 1 to about 20% octene as commoner.

13. The film of claim 11 wherein said copolymer of ethylene and vinyl acetate has a vinyl acetate content ranging from about 1 to about 20%.

14. The film of claim 12 wherein said copolymer of ethylene and vinyl acetate has a vinyl acetate content ranging from about 1 to about 20%.

15. The film of claim 11 wherein said high density polyethylene has a density in the range of about 0.940 to about 0.950 g/cm³.

16. The film of claim 12 wherein said high density polyethylene has a density in the range of about 0.940 to about 0.950 g/cm³.

17. The film of claim 13 wherein said high density polyethylene has a density in the range of about 0.940 to about 0.950 g/cm³.

18. The film of claim 11 wherein said melt index of said high density polyethylene is between about 0.1 and about 0.5 g/cm³.

19. The film of claim 11 wherein said melt index of said ethylene plastomer is between about 0.1 to about 5 g/10 min.

20. The film of claim 11 wherein said ethylene vinyl copolymer has a vinyl acetate content ranging from about 1 to about 10%.

* * * * *